United States Patent
Hayashi

(10) Patent No.: US 7,779,095 B2
(45) Date of Patent: Aug. 17, 2010

(54) APPARATUS FOR COMMUNICATING WITH EXTERNAL APPARATUS, CONTROLLING METHOD, AND COMPUTER-READABLE STORAGE MEDIUM

(75) Inventor: Kenichirou Hayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 12/034,136

(22) Filed: Feb. 20, 2008

(65) Prior Publication Data

US 2008/0201445 A1    Aug. 21, 2008

(30) Foreign Application Priority Data

Feb. 21, 2007    (JP) .............................. 2007-040905

(51) Int. Cl.
*G06F 15/177* (2006.01)
(52) U.S. Cl. ........................ 709/221; 709/217; 709/220; 709/231; 709/232; 709/245
(58) Field of Classification Search ................. 709/217, 709/221, 220, 231, 232, 245
See application file for complete search history.

(56) References Cited

U.S. PATENT DOCUMENTS

2004/0064520 A1* 4/2004 Takahashi et al. ........... 709/208
2005/0198344 A1* 9/2005 Fujita ......................... 709/231

FOREIGN PATENT DOCUMENTS

JP        2005-086263 A     3/2005

* cited by examiner

Primary Examiner—Hassan Phillips
Assistant Examiner—Glenford Madamba
(74) Attorney, Agent, or Firm—Canon U.S.A., Inc., IP Division

(57) ABSTRACT

An apparatus receives an address for use in communication with an external apparatus and a lease period of the address. When the apparatus is switched into a state where the amount of electric power provided to the apparatus is reduced, the apparatus determines whether the address is valid based on the lease period of the address. If the address is valid, the apparatus carries out communication using the received address.

10 Claims, 13 Drawing Sheets

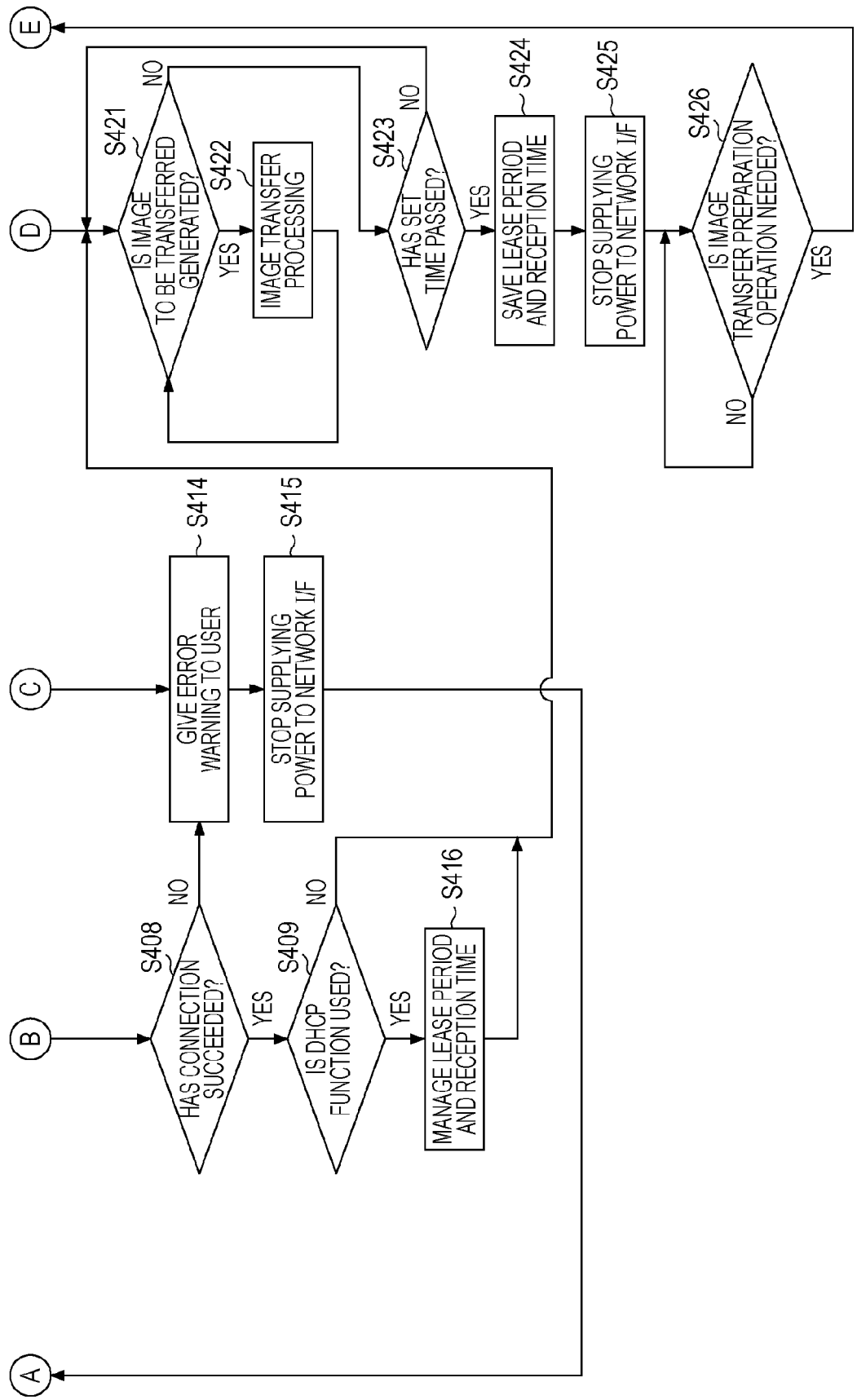

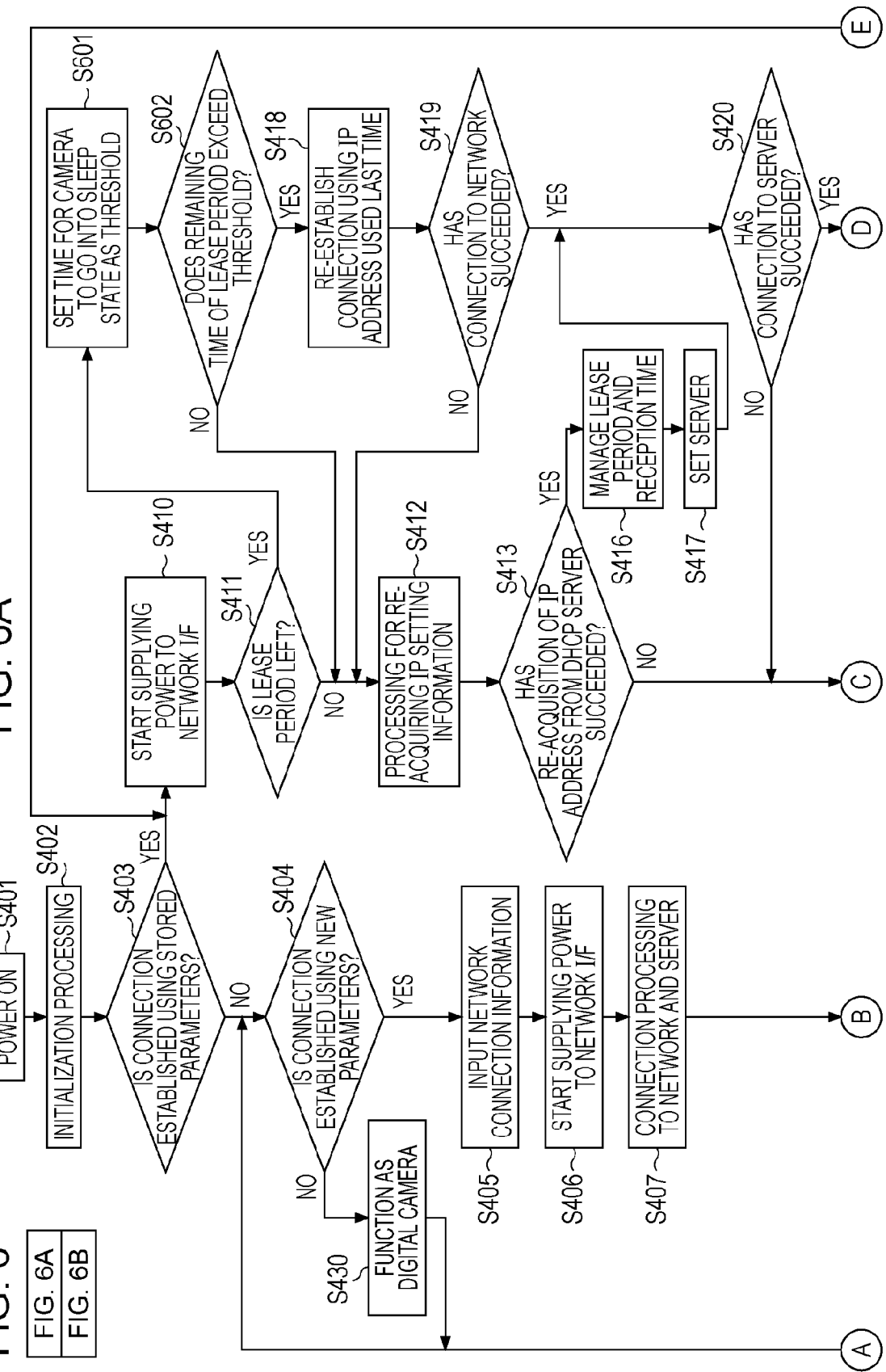

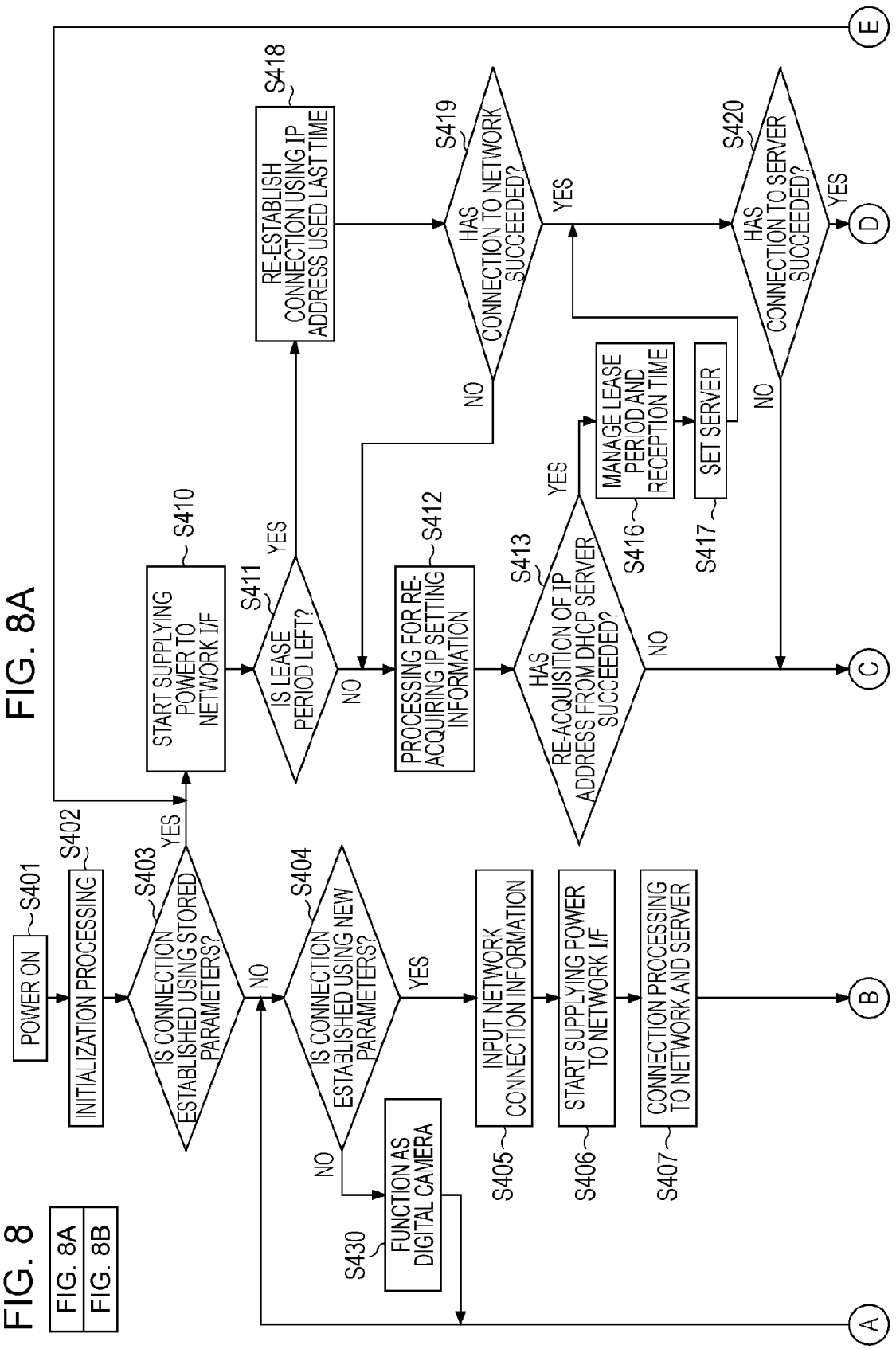

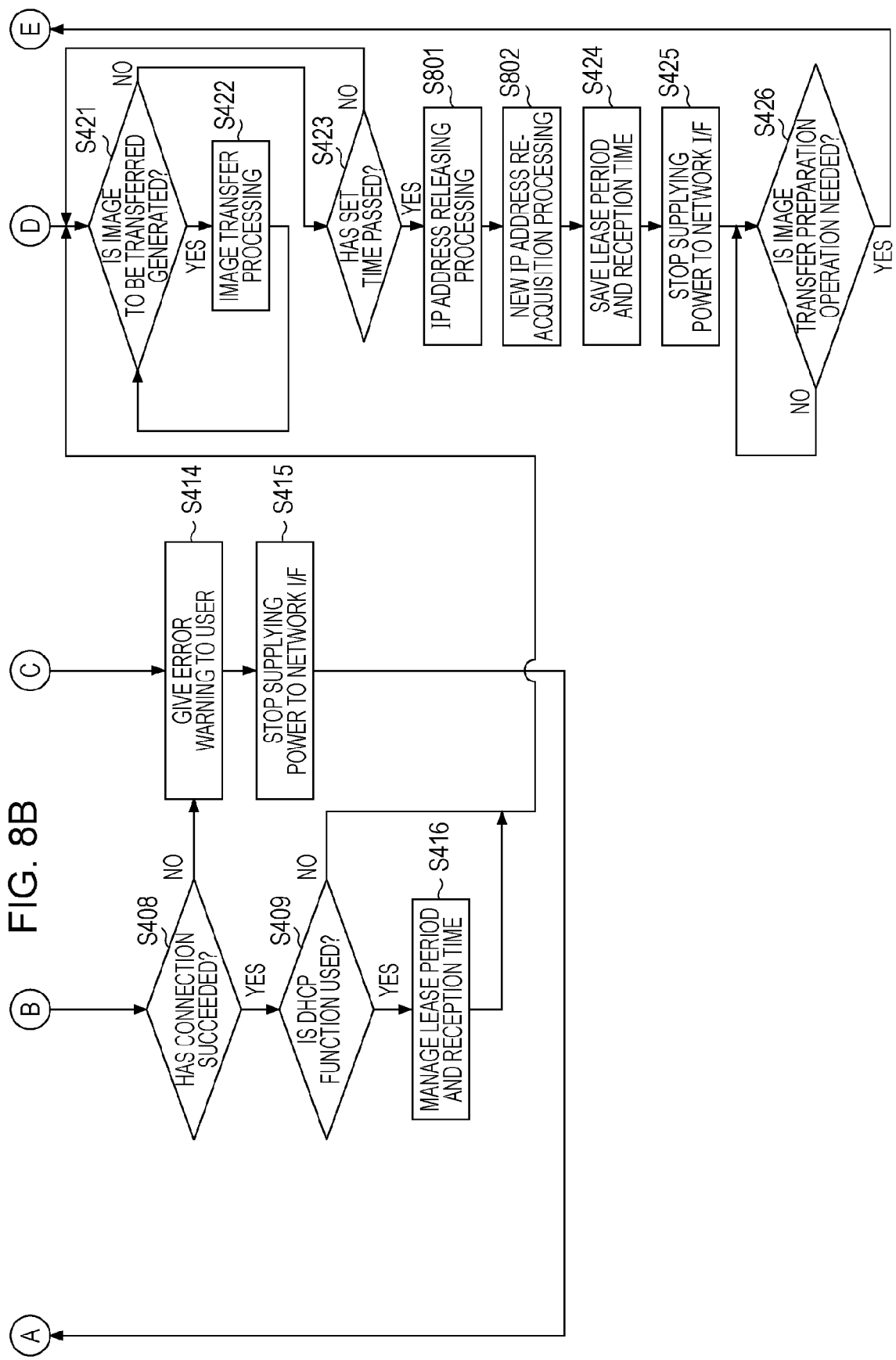

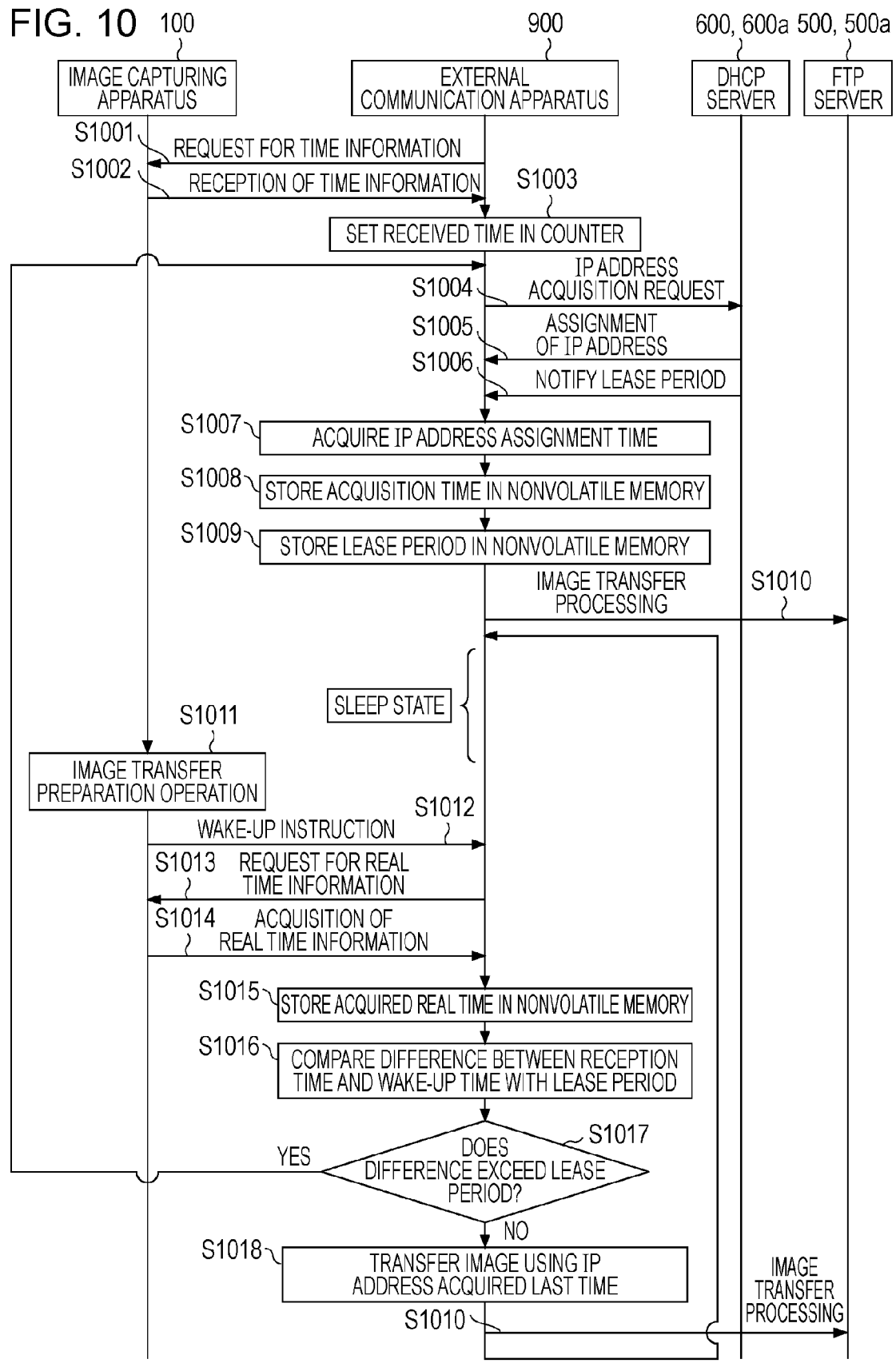

APPARATUS FOR COMMUNICATING WITH EXTERNAL APPARATUS, CONTROLLING METHOD, AND COMPUTER-READABLE STORAGE MEDIUM

BACKGROUND OF THE INVENTION

1. Field of the Invention

The present invention relates to address management of apparatuses connectable to networks.

2. Description of the Related Art

With the recent widespread use of broadband networks, the use of consumer access lines, such as ADSL (Asymmetric Digital Subscriber Line) and FTTH (Fiber To The Home), has increased. In addition, wireless infrastructures that allow network communication to be performed inside and outside buildings utilizing access points or PHS (Personal Handyphone System) have been established. Furthermore, digital cameras capable of sending captured images to personal computers or the like located at a remote place utilizing these infrastructures have been also suggested.

On the other hand, to carry out communication via IP (Internet Protocol) networks, acquisition of information, such as IP addresses and configuration information, is required. A DHCP (Dynamic Host Configuration Protocol) function has been developed as one of such acquisition mechanisms. This function is realized by DHCP clients and a DHCP server working in cooperation with each other. More specifically, IP addresses to be assigned to the DHCP clients as well as IP addresses of various servers, such as a default gateway and a DNS (Domain Name System) server that allow communication to be performed via the IP networks, are previously set in the DHCP server. By acquiring such information from the DHCP server at the time of booting of the system, the DHCP clients can automatically perform setting of the network information without troubling users.

Furthermore, mobile terminal devices (e.g., a mobile phone, a PHS, a personal computer, a PDA (Personal Digital Assistant), and a digital camera) can stop supplying the electric power to a block having a function for connecting the devices to an IP network when a communication mode is terminated. Since the electric power is not supplied to the block related to communication while the devices are not connected to the network, excessive power consumption is eliminated, as a result of which, saving of the power consumption can be realized.

These devices require processing for acquiring IP addresses or the like every time the devices re-initiate communication and re-connect to the IP network. Accordingly, processing for acquiring information necessary for network setting using the DHCP function undesirably takes time. In addition, when one DHCP server manages many DHCP clients connected to a network, the traffic from and to the DHCP server undesirably increases.

Accordingly, as disclosed in Japanese Patent Laid-Open No. 2005-86263, a technique for establishing a connection to an IP network at the time of the first communication setting and for performing communication thereafter using the initially set information is known. This technique can suppress the traffic to the DHCP server to some extent.

However, digital cameras disclosed in Japanese Patent Laid-Open No. 2005-86263 determine whether the setting information acquired at the time of first communication setting is usable when the digital cameras perform communication setting using the DHCP function thereafter. Accordingly, the digital cameras have to re-acquire setting information if the attempt to communicate with external apparatuses using the setting information acquired at the time of the first communication setting fails. For this reason, the processing for acquiring information necessary for network setting using the DHCP function undesirably takes time.

SUMMARY OF THE INVENTION

The present invention is directed to overcome the above-described drawbacks and disadvantages.

In an exemplary embodiment of the present invention, image capturing apparatuses (e.g., digital camcorders) each having a plurality of digital interfaces, are controlled through a plurality of digital interfaces, thereby improving the usability of the image capturing apparatuses.

According to an aspect of the present invention, an apparatus capable of transmitting and receiving data to and from an external device includes a first receiving unit configured to receive an address for communicating with the external device and information on a lease period of the address, an electric power controlling unit configured to control electric power supplied to the apparatus, wherein the apparatus is switched between a first state and a second state based on an amount of electric power being supplied, and a determining unit configured to determine whether the address is valid based on the lease period of the address if the apparatus is switched from the second state to the first state. The apparatus carries out the communication with the external device using the received address if the address is valid.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention, together with the description, serve to explain the principles of the present invention.

FIGS. 4A and 4B are flowcharts illustrating a procedure of a network connection process according to an exemplary embodiment of the present invention.

FIGS. 6A and 6B are flowcharts illustrating processing according to an exemplary embodiment of the present invention.

FIGS. 8A and 8B are flowcharts illustrating processing according to an exemplary embodiment of the present invention.

FIG. 10 is a sequence diagram illustrating processing according to an exemplary embodiment of the present invention.

DESCRIPTION OF THE EMBODIMENTS

Exemplary embodiments, features and aspects of the present invention will now be described in detail below with reference to the attached drawings.

In a first exemplary embodiment, a network device according to an aspect of the present invention will be described with reference to the accompanying drawings. This exemplary embodiment can be applied to image capturing apparatuses, such as cameras, digital cameras, and digital camcorders, which are capable of capturing images of a subject and of outputting image data.

Figure 1:
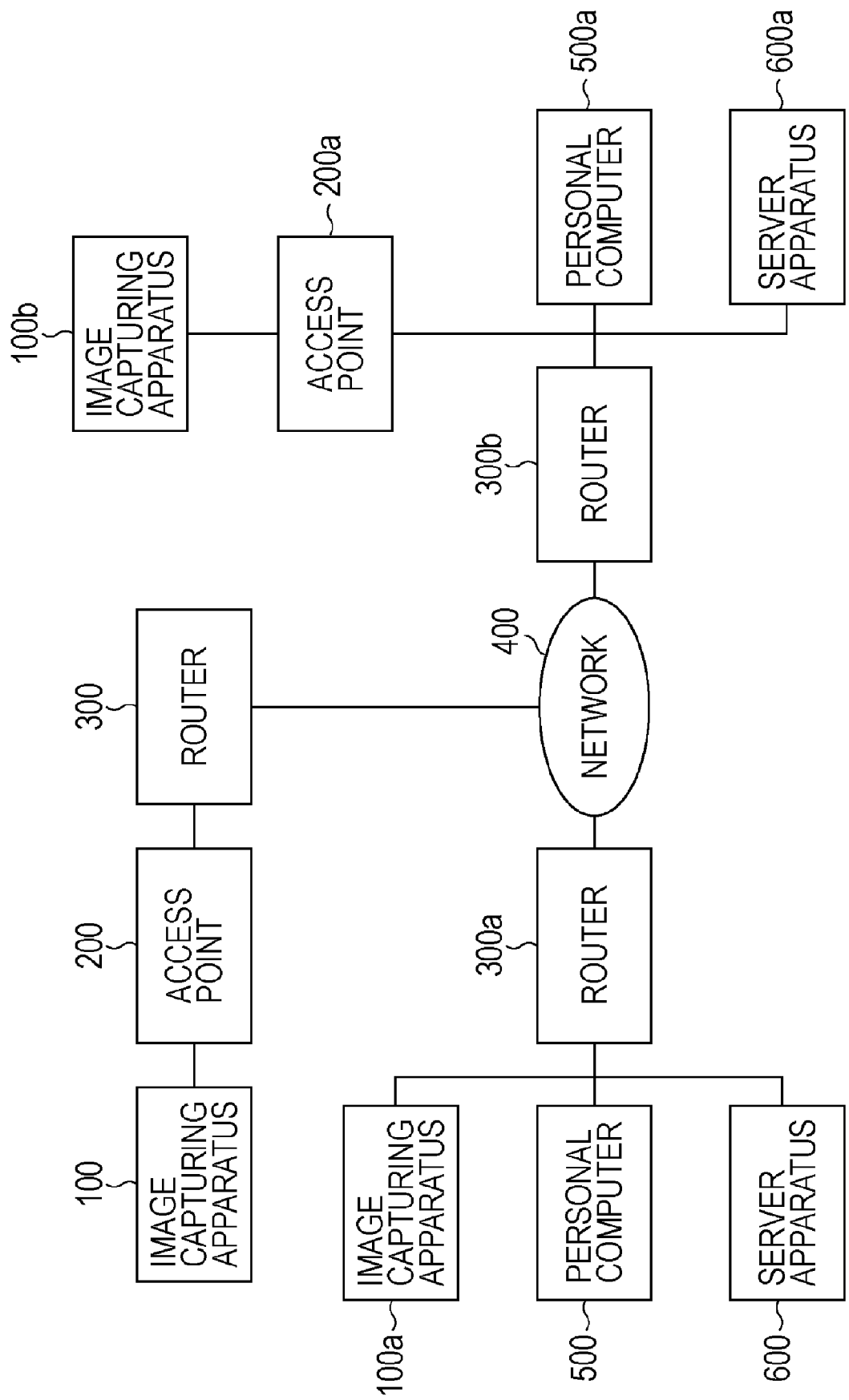
FIG. 1 is a network configuration diagram according to an exemplary embodiment of the present invention.

FIG. 1 is a configuration diagram showing a configuration of an image capturing system according to the present embodiment of the present invention. Reference numerals 100, 100a, and 100b represent image capturing apparatuses, whereas reference numerals 200 and 200a represent access points. Reference numerals 300, 300a, and 300b represent routers, whereas reference numeral 400 represents a network. Reference numerals 500 and 500a represent personal computers, whereas reference numerals 600 and 600a represent server apparatuses.

When the image capturing apparatus 100 uses a wireless LAN (Local Area Network) function, the image capturing apparatus 100 is connected to the network 400 through the access point 200 and the router 300. When the image capturing apparatus 100 uses a wired LAN function, the image capturing apparatus 100 is directly connected to the router 300 with a LAN cable or the like and is ultimately connected to the network 400.

The personal computers 500 and 500a and the server apparatuses 600 and 600a are connected to the network 400 through the routers 300a and 300b, respectively.

According to the present embodiment, the server apparatuses 600 and 600a have a DHCP server function. This function is a function for dynamically assigning IP addresses at the time of the first setting of communication with DHCP clients and for getting back the IP addresses at the time of the end of communication.

In addition, the image capturing apparatuses 100, 100a, and 100b have a DHCP client function. This function is a function for automatically acquiring IP addresses needed by the image capturing apparatuses 100, 100a, and 100b to communicate with external devices and for establishing a connection to the network 400. This function allows the image capturing apparatuses 100, 100a, and 100b to send data of images captured thereby to external devices, such as the personal computers 500 and 500a, via the network 400.

Figure 2:
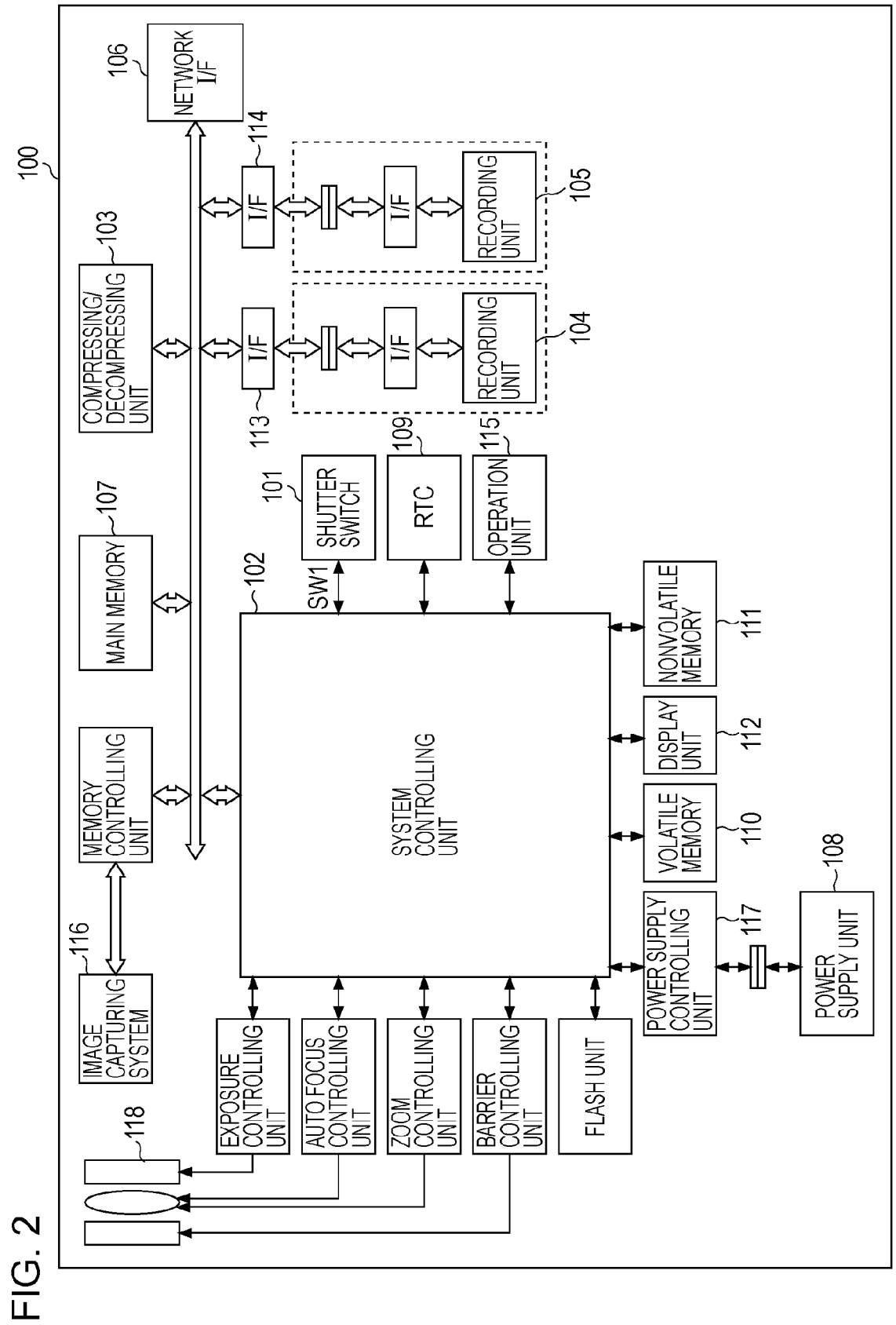
FIG. 2 is a block diagram of an image capturing apparatus according to an exemplary embodiment of the present invention.

FIG. 2 is a block diagram showing a configuration of the image capturing apparatuses 100, 100a, and 100b according to the present embodiment. The description will be given here for the image capturing apparatus 100.

Referring to FIG. 2, in response to pressing of a shutter switch 101, an image capturing operation starts. An image capturing system 116, such as a CCD (Charge Coupled Device), acquires an image of a subject via lens 118 at the time of pressing of the shutter switch 101 as image data. A compressing/decompressing unit 103 compresses the acquired image data according to a predetermined format. A system controlling unit 102, which is one kind of CPU (Central Processing Unit), controls operations of the image capturing apparatus 100 according to input signals and programs. The system controlling unit 102 processes the image data compressed by the compressing/decompressing unit 103. The image data processed by the system controlling unit 102 is stored in memory cards 104 and 105 through card interfaces (hereinafter, abbreviated as "card I/Fs") 113 and 114, respectively. The image capturing apparatus 100 according to the present embodiment has two card I/Fs and can access two memory cards 104 and 105. While two card I/Fs are described in the present embodiment, any number of card I/Fs that would enable practice of the present invention is applicable.

The image capturing apparatus 100 according to the present embodiment can send and receive image data to and from other external devices through a network connection interface (hereinafter, referred to as a "network I/F") 106. For example, the image capturing apparatus 100 can send the captured image data stored in the memory cards 104 and 105 or image data that is temporarily stored in a main memory 107 before being written in the memory cards 104 and 105.

The network I/F 106 includes a LAN interface. The image capturing apparatus 100 can be connected to a LAN with a LAN cable. The image capturing apparatus 100 is connected to the network 400, e.g., the Internet, through this LAN.

The network I/F 106 includes an Ethernet connection circuit or a wireless LAN connection circuit. The image capturing apparatus 100 can be switched into a communication mode. In response to a user operation, the image capturing apparatus 100 is switched into the communication mode. In response to insertion of a LAN card into the card I/F 113 or 114, the communication function may be given to the image capturing apparatus 100.

A power supply unit 108 receives electric power control performed by the system controlling unit 102 through a power supply controlling unit 117 and supplies the electric power to each block of the image capturing apparatus 100. Upon a communication mode being started, the system controlling unit 102 requests the power supply unit 108 to supply the electric power. The power supply unit 108, in turn, starts supplying the electric power to the network I/F 106. In response to disconnection of communication with external devices and termination of the communication mode, the power supply unit 108 stops supplying the electric power to the network I/F 106. When a LAN card is inserted into the card I/F 113 or 114, the power supply unit 108 starts and stops supplying the electric power to the card I/F 113 or 114 instead of the network I/F 106.

The image capturing apparatus 100 includes an RTC (Real Time Clock) 109 therein. The RTC 109 can keep updating time information using an internal battery (not shown) even if the image capturing apparatus 100 is turned off.

A RAM (Random Access Memory) is generally employed as a volatile memory 110. The volatile memory 110 is used for temporarily storing read out data or parameters.

A nonvolatile memory 111 is used for storing various kinds of data and parameters. For example, the nonvolatile memory 111 stores parameters used by the image capturing apparatus 100 to establish a connection to a network (hereinafter, referred to as "connection parameters").

Under the control of the system controlling unit 102, a display unit 112 displays images corresponding to the captured image data or GUIs (Graphical User Interfaces) for use in user operations.

An operation unit 115 includes various kinds of operation members for receiving instructions of users. Various kinds of members, such as pressable or slidable switches, rotatable dials, a touch panel, and a touch wheel, can be used as the operation members.

A method for managing IP addresses assigned by the DHCP servers 600 and 600a and lease periods of the IP addresses will be described next using the image capturing apparatus 100 having the above-described configuration.

Figure 4A:
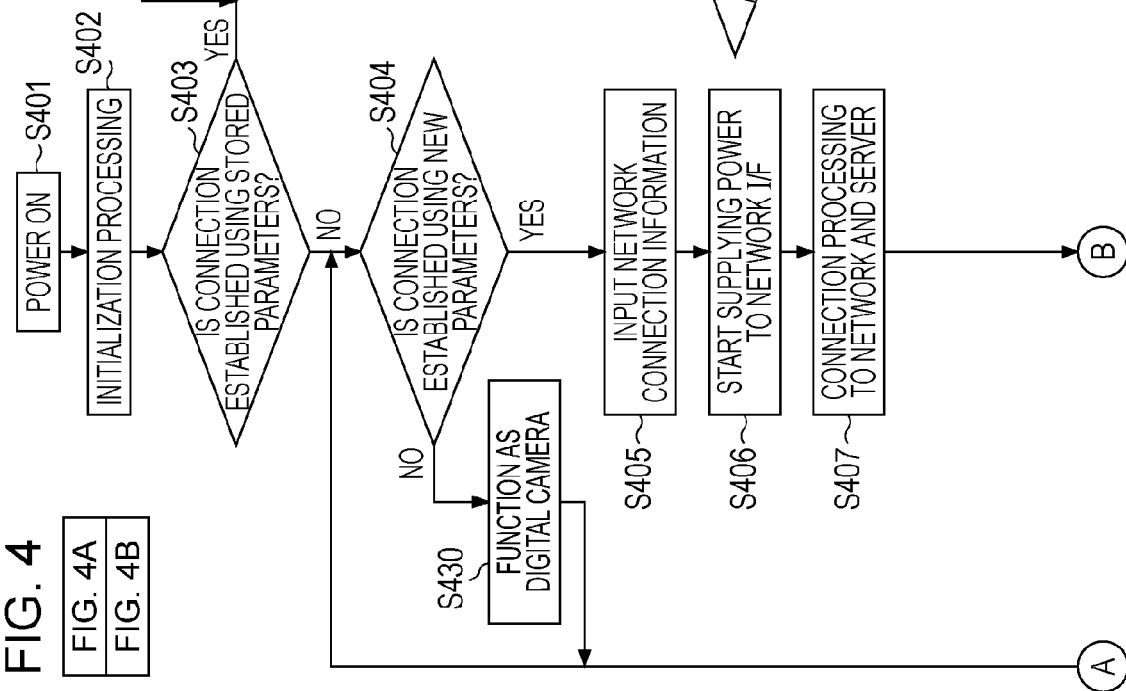

FIGS. 4A and 4B are flowcharts illustrating a procedure of a network connection process performed by the image capturing apparatus 100.

In the present embodiment, it is assumed that processing for transferring an image is performed between the image capturing apparatus 100 and the personal computer 500 serving as an FTP (File Transfer Protocol) server. In addition to the FTP, PTP (Picture Transfer Protocol) and HTTP (Hyper Text Transfer Protocol), or any other protocol that would enable practice of the present invention, can be employed as the communication protocol employed by the image capturing apparatus 100.

First, a user, such as a photographer, operates the operation unit 115 to turn on the image capturing apparatus 100. Upon detecting the power-on (STEP S401), the system controlling unit 102 executes processing for initializing the image capturing apparatus 100 (STEP S402). After finishing the initialization processing, the image capturing apparatus 100 waits for a user operation.

The user then operates the operation unit 115 to instruct the image capturing apparatus 100 to establish a connection to the network 400. In response to the user's instruction, the image capturing apparatus 100 displays a GUI for prompting the user to select whether to use the stored connection parameters on the display unit 112 and accepts the user's selection. Based on the user's selection, the system controlling unit 102 determines whether to use the stored connection parameters in establishment of the connection (STEP S403). When establishing the connection using the stored connection parameters, the process advances to STEP S410. When the connection is not established using the stored connection parameters, the process advances to STEP S404.

At STEP S404, the system controlling unit 102 determines whether an instruction for establishing the connection using new connection parameters is entered through the user operation. If the instruction is entered, the process advances to STEP S405. If the instruction is not entered, the process advances to STEP S430. At STEP S430, the system controlling unit 102 sets image capturing apparatus 100 to an image capturing mode in which the communication function is not used.

At STEP S405, the system controlling unit 102 displays a connection parameter setting screen on the display unit 112 and accepts an input of various kinds of connection parameters through a user operation. The system controlling unit 102 stores the input connection parameters in the volatile memory 110, thereby setting the connection parameters.

At STEP S406, the system controlling unit 102 controls the power supply unit 108 to supply the electric power to the network I/F 106.

At STEP S407, the system controlling unit 102 performs processing for establishing a connection to the network 400 using the connection parameters input at STEP S405.

At STEP S408, the system controlling unit 102 determines whether the connection to the network 400 has succeeded, i.e., whether the connection to the network 400 has been established. If the connection has been established, the process advances to STEP S409. If the connection to the network 400 has not been established, the process advances to STEP S414. At STEP S414, the system controlling unit 102 notifies the user that establishment of the connection has failed. At STEP S415, the system controlling unit 102 stops supplying the electric power to the network I/F 106, and the process returns to STEP S404. Here, a case where establishment of the connection fails corresponds to, for example, a case where the connection parameters input by the user are wrong.

Processing performed when the connection to the network 400 is established is described below.

At STEP S409, the system controlling unit 102 determines, with reference to the connection parameters, whether the image capturing apparatus 100 is set to acquire a dynamic IP address from the DHCP server 600 or 600a using the DHCP function. When the DHCP function is used, the process advances to STEP S416. When the DHCP function is not used, the process advances to STEP S421.

At STEP S416, the system controlling unit 102 receives an IP address or the like that is sent from the DHCP server and then stores the IP address in the volatile memory 110.

Processing performed when the image capturing apparatus 100 receives an IP address from the DHCP server (i.e., processing performed at STEP S416) is described below using a sequence diagram illustrated in FIG. 3. It is assumed that the image capturing apparatus 100 communicates with the DHCP server 600a.

First, at STEP S301, the system controlling unit 102 sends an IP address acquisition request to the DHCP server 600a.

At STEP S302, the DHCP server 600a assigns an IP address to the image capturing apparatus 100 and sends the IP address to the image capturing apparatus 100.

At STEP S303, the system controlling unit 102 receives the IP address and stores the IP address in the volatile memory 110.

At STEP S304, the system controlling unit 102 refers to the RTC 109 and acquires time information. The system controlling unit 102 then stores the acquired time information in the volatile memory 110 as an IP address reception time (hereinafter, referred to as a "reception time"). While in the present embodiment the image capturing apparatus 100 acquires the reception time from the RTC 109, the time information may be acquired from a GPS (Global Positioning System) or the like.

At STEP S305, the DHCP server 600a sends information on a lease period of the IP address to the image capturing apparatus 100. This lease period is decided by the DHCP server 600a. The information on the lease period is not necessarily sent at this time. For example, the information may be sent at STEP S302 along with the IP address.

At STEP S306, the system controlling unit 102 stores the lease period information received from the DHCP server 600a in the volatile memory 110.

The processing having been described above corresponds to processing for receiving an IP address from the DHCP server 600a performed by the image capturing apparatus 100 at STEP S416 of FIG. 4B.

A description will now be given for processing for capturing an image and transferring the captured image performed by the image capturing apparatus 100 having received the IP address. This processing begins at STEP S421 of FIG. 4B.

At STEP S421, the system controlling unit 102 determines whether a transfer target image is generated. For example, when a new image is generated through image capturing processing, the generated image is treated as a target of the transfer. If the system controlling unit 102 determines that the target image is generated, the process proceeds to STEP S422. On the other hand, if the system controlling unit 102 determines that the target image is not generated, the process proceeds to STEP S423.

At STEP S422, the system controlling unit 102 transfers the image to the FTP server 500 or 500a set by the connection parameters through the network I/F 106 (STEP S307). The process then returns to STEP S421.

At STEP S423, the system controlling unit 102 determines whether a predetermined time has passed since the transfer target image no longer exists. That is, the system controlling unit 102 determines whether a transfer target image is not generated for a predetermined period. If the predetermined time has passed, the system controlling unit 102 advances the process to STEP S424. If the predetermined time has not passed, the process returns to STEP S421. Meanwhile, the predetermined time (hereinafter, referred to as a "sleep shifting time") is previously stored in the nonvolatile memory 111.

The system controlling unit 102 starts switching the state of the image capturing apparatus 100 into a sleep state at steps starting from STEP S424. The sleep state is one of several power saving states. In the sleep state, the supply of electric power to the network I/F 106 from the power supply unit 108 is stopped, whereas the supply of electric power to the image capturing apparatus 100 is not stopped.

At STEP S424, the system controlling unit 102 saves, in the nonvolatile memory 111, the lease period and the reception time stored in the volatile memory 110.

At STEP S425, the power supply unit 108 stops supplying the electric power to the network I/F 106 to switch the network I/F 106 into a sleep state.

Since the power supply to the image capturing apparatus 100 is not stopped, the supply of electric power to the volatile memory 110 is not stopped. Thus, the connection parameters stored in the volatile memory 110 are not erased.

A case where the supply of electric power to the image capturing apparatus 100 is stopped will be described next. Processing for stopping supplying the electric power is executed based on a user operation as interruption processing during the processing flow shown in FIGS. 4A and 4B.

When the supply of electric power to the image capturing apparatus 100 is stopped, the supply of electric power to the volatile memory 110 as well as the network I/F 106 is stopped (hereinafter, this state is referred to a "power saving state"). In this case, the system controlling unit 102 stores the lease period information and the reception time, which are stored in the volatile memory 110, in the nonvolatile memory 111 in association with each other. That is, the connection parameter information stored in the volatile memory 110 is stored in the nonvolatile memory 111 so that the connection parameters are not erased even if the supply of electric power to the image capturing apparatus 100 is stopped.

The case where the image capturing apparatus 100 includes the network I/F 106 has been described. However, the image capturing apparatus 100 does not have to include the communication function. For example, by connecting an image capturing apparatus not having the communication function to an apparatus including a network I/F (hereinafter, referred to as a "network apparatus") with a connector and a cable, the function similar to that of the image capturing apparatus 100 having the configuration shown in FIG. 2 can be realized.

In such a case, the network apparatus can be switched into the power saving state independent from the image capturing apparatus 100. Thus, when the network apparatus is switched into the power saving state, a loss of the connection parameters stored in a volatile memory of the network apparatus can be prevented by storing the connection parameters in the nonvolatile memory 111 of the image capturing apparatus 100.

Figure 3:
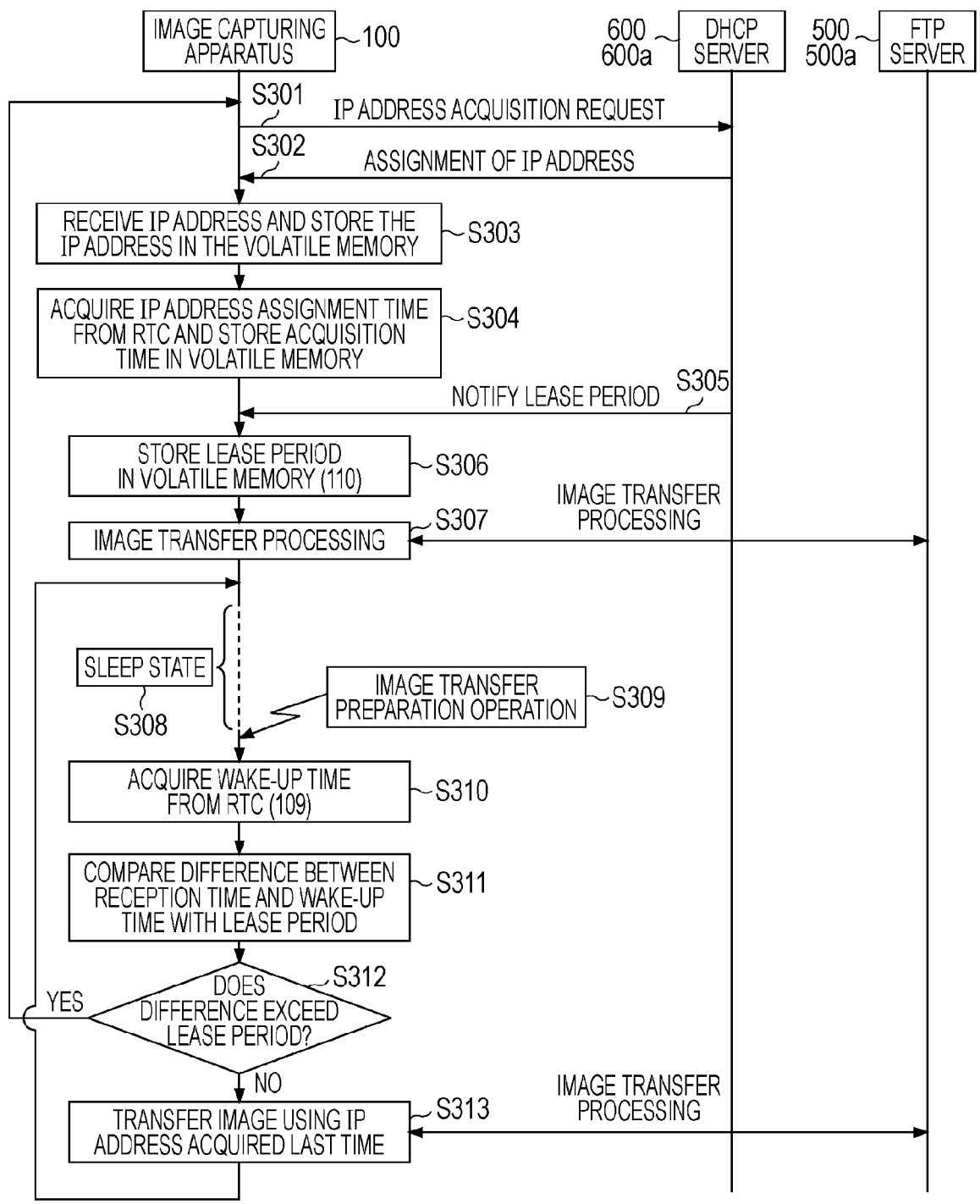
FIG. 3 is a sequence diagram illustrating processing according to an exemplary embodiment of the present invention.

Processing performed after the image capturing apparatus 100 is switched into the sleep state is illustrated in FIG. 3 beginning with STEP S308, and is described below.

At STEP S426, the system controlling unit 102 determines whether an image transfer preparation operation (hereinafter, simply referred to as a "preparation operation") is requested.

If the system controlling unit 102 determines that the preparation operation is requested, the process advances to STEP S410. If the system controlling unit 102 determines that the preparation operation is not requested, the system controlling unit 102 repeats this determination until the preparation operation is requested.

Turning to FIG. 3, the preparation operation (STEP S309) is requested when a user presses the shutter switch 101 or when a user performs an operation for switching the image capturing apparatus 100 into a transfer target image selection mode on a GUI screen displayed on the display unit 112. When a user operates any one of the operation members of the operation unit 115 of the image capturing apparatus 100 while the image capturing apparatus 100 is in the power saving state, the image capturing apparatus 100 wakes up from the power saving state. However, the electric power is not supplied to the network I/F 106 until the preparation operation is requested. By waking up the network I/F 106 from the sleep state only when the communication is highly likely to occur, the power consumption can be suppressed.

Returning to FIG. 4A, at STEP S410, the system controlling unit 102 expects that the image transfer processing will start and starts supplying the electric power to the network I/F 106.

At STEP S411, the system controlling unit 102 determines whether the lease period still remains. Processing performed at STEP S411 will be described in detail below with reference to FIG. 3.

In response to the preparation operation (STEP S309), the system controlling unit 102 stores the present time in the volatile memory 110 as a wake-up time from the sleep state (hereinafter, referred to as a "wake-up time") with reference to the RTC 109 at STEP S310.

At STEP S311, the system controlling unit 102 compares the lease period with an elapsed time since the reception of the IP address. More specifically, the system controlling unit 102 reads out the lease period information and the reception time stored in the volatile memory 110. The system controlling unit 102 then determines the difference between the wake-up time and the reception time to calculate the elapsed time since the reception of the IP address. The system controlling unit 102 then compares the elapsed time with the lease period.

At STEP S312, the system controlling unit 102 determines whether the elapsed time since the reception of the IP address is longer than the lease period. Upon determining that elapsed time is longer than the lease period, the process returns to STEP S301. If the system controlling unit 102 determines that the elapsed time is not longer than the lease period, the process proceeds to STEP S313. Operations performed at STEPs S310 to S312 correspond to processing performed at STEP S411 of FIG. 4A.

A case where the elapsed time since the reception of the IP address is determined to be not longer than the lease period at STEP S411, i.e., a case where the lease period still remains, will now be described. In this case, the IP address stored in the volatile memory 110 is still valid.

At STEP S418, the system controlling unit 102 reads out the IP address from the volatile memory 110 and starts establishing a connection to the network 400 (STEP S313 and S418).

At STEP S419, the system controlling unit 102 then determines whether the connection to the network 400 has been established. If the system controlling unit 102 determines that the connection has been established, the process proceeds to STEP S420. If the system controlling unit 102 determines that the connection has not been established, the process proceeds to STEP S412. At STEP S412, the system controlling unit 102 re-acquires an IP address.

At STEP S420, the system controlling unit 102 determines whether a connection to the FTP server apparatus 500a has been established. If the system controlling unit 102 determines that the connection has been established, the process proceeds to STEP S421. If the system controlling unit 102 determines that the connection has not been established, the process proceeds to STEP S414.

A case where the elapsed time since reception of the IP address is longer than the lease period, i.e., a case where the lease period is determined to have expired at STEP S411, will be described next. In this case, the DHCP server 600a may have assigned the IP address used by the image capturing apparatus 100 to another network device. In such a case, if the image capturing apparatus 100 uses the stored IP address, a collision of IP addresses may occur.

Thus, at STEP S412, the system controlling unit 102 re-acquires an IP address. An acquisition method has been described at STEPs S301 to S303 of FIG. 3.

At STEP S413, the system controlling unit 102 determines whether the image capturing apparatus 100 successfully receives a new IP address from the DHCP server 600a. If the reception is successful, the process proceeds to STEP S416. If the reception is not successful, the process proceeds to STEP S414.

At STEPs S416 and S417, the system controlling unit 102 starts processing for establishing a connection to the FTP server 500a based on the acquired IP address and the connection parameters stored in the volatile memory 110.

At STEP S420, the system controlling unit 102 determines whether the connection to the FTP server 500a has been established. If the connection has been established, the process advances to STEP S421. At STEP S421, the system controlling unit 102 determines whether to switch the apparatus 100 into the sleep state. If the connection has not been established, the process proceeds to STEP S414.

As described above, according to the present embodiment, since a connection to a network is established at the time of the first communication mode setting after power-on of the image capturing apparatus 100, the image capturing apparatus 100 is not connected to the network until the communication mode is set, which thus can reduce the power consumption.

Furthermore, in the present embodiment, the image capturing apparatus 100 compares a lease period of an IP address with an elapsed time since acquisition of the IP address after waking up from the sleep state and re-acquires another IP address from a server apparatus if the lease period has expired. This eliminates the necessity for permanent connection of the image capturing apparatus 100 to a DHCP server after the wake-up from the sleep state, which thus can shorten a time necessary for transferring an image. In addition, a frequency of accessing the DHCP server is reduced, which leads to an improvement in throughput. Moreover, in the present embodiment, the image capturing apparatus 100 calculates an elapsed time since the reception of an IP address even while the network I/F is brought into the sleep state and is not supplied with the electric power. This allows the image capturing apparatus 100 to accurately grasp the validity of the IP address even if the image capturing apparatus 100 is in the sleep state.

A second exemplary embodiment of the present invention will be described next. An image capturing apparatus according to the first exemplary embodiment re-acquires an IP address when an elapsed time since reception of an IP address is longer than a lease period, i.e., when a valid period of the IP address has expired. However, in the present embodiment, an image capturing apparatus re-acquires an IP address when the remaining valid period of the IP address is shorter than a threshold.

The configuration and processing of the present embodiment are similar to the configuration and processing of the first embodiment. As such, only the differences will be described herein.

The present embodiment differs from the first embodiment in handling of an IP address and a lease period received from DHCP servers 600 and 600a. A case where an image capturing apparatus 100 receives an IP address from the DHCP server 600a will be described below with reference to FIGS. 5, 6A, and 6B.

It is assumed that images are transferred between the image capturing apparatus 100 and a personal computer 500a functioning as an FTP (File Transfer Protocol) server in the present embodiment. It is also assumed that an IP address is sent from the DHCP server 600a.

Figure 5:
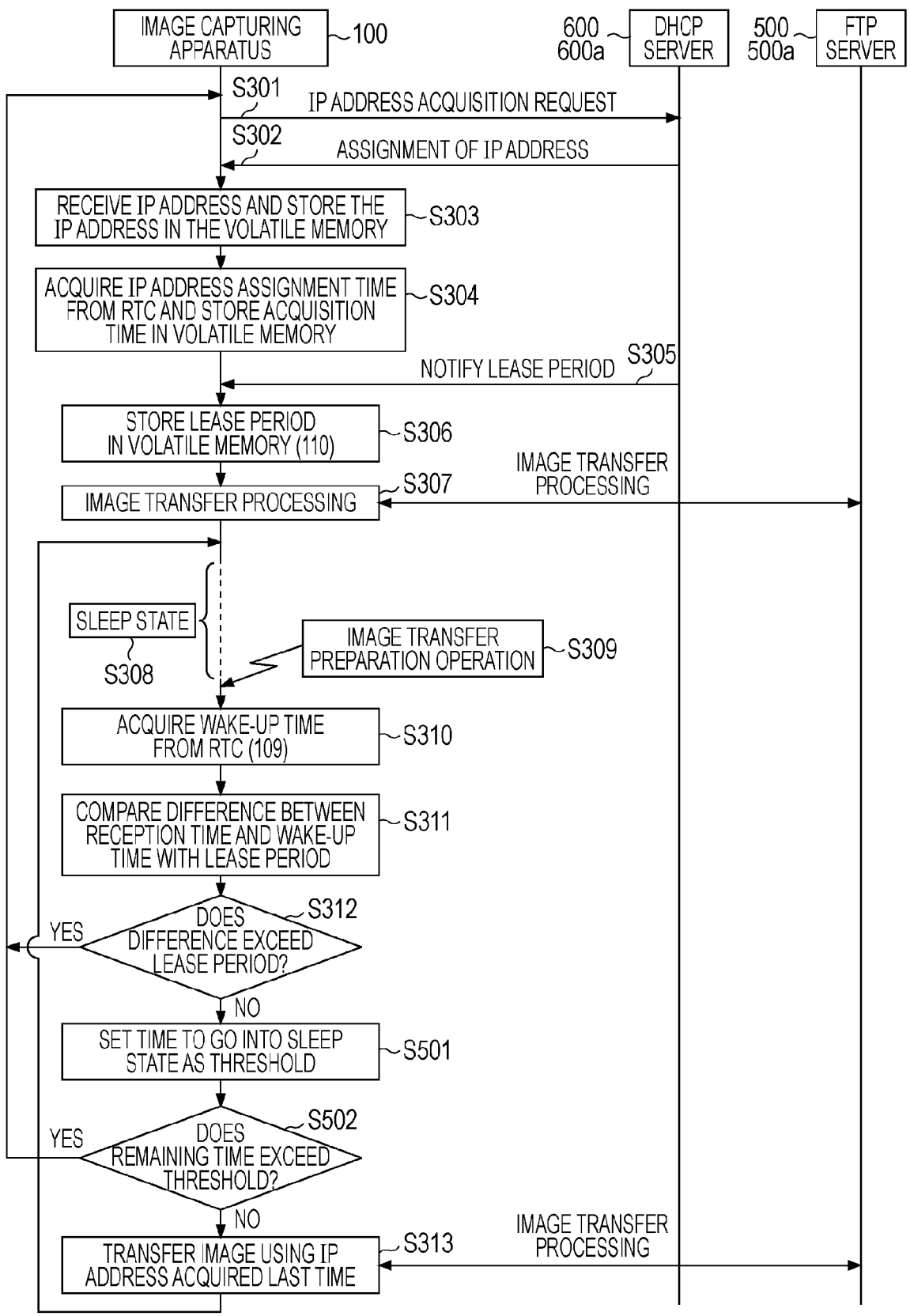
FIG. 5 is a sequence diagram illustrating processing according to an embodiment of the present invention.

The process illustrated in FIG. 5 is similar to the process illustrated in FIG. 3. Thus, only the differences will be described herein.

Figure 6B:
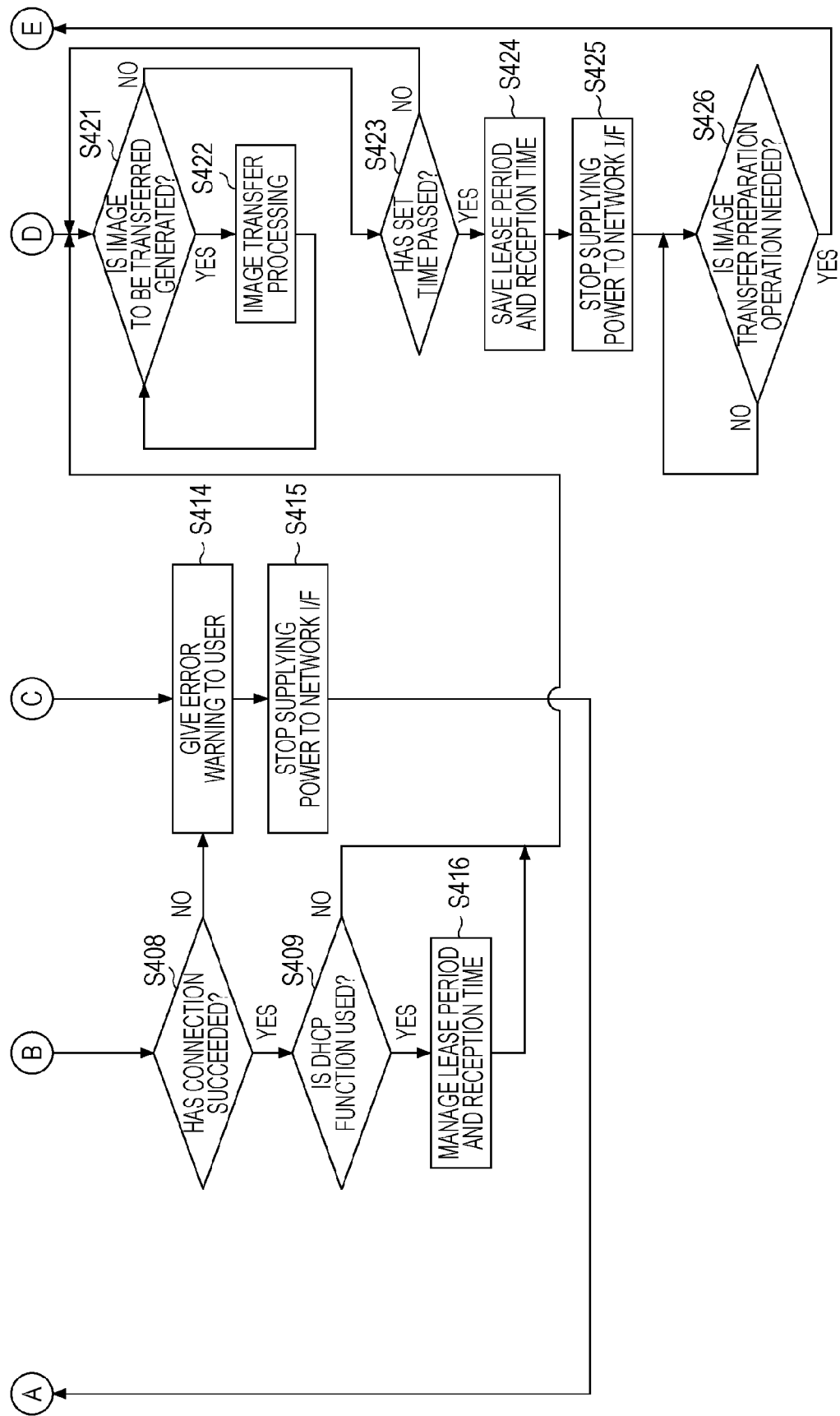

A flowchart shown in FIGS. 6A and 6B differs from the flowchart in FIGS. 4A and 4B in that processing at STEPs S601 and S602 is performed before STEP S418. Processing performed at these steps will be described below.

If a time elapsed since reception of an IP address is shorter than a lease period, i.e., if the lease period still remains, at STEP S411 of FIG. 6A, the process advances to STEP S601.

At STEP S601, the system controlling unit 102 sets a sleep shifting time as a threshold and stores the threshold in a volatile memory 110 (STEP S501 in FIG. 5 corresponds to STEP S601). At STEP S602, the system controlling unit 102 compares the threshold set at STEP S601 with the remaining lease period to determine whether the remaining lease period is longer than the threshold (STEP S502 in FIG. 5 corresponds to STEP S602). If the remaining lease period is longer than the threshold, the process proceeds to STEP S418. At STEP S418, the system controlling unit 102 establishes a connection to a network 400 using an IP address having been received. If the remaining lease period is not longer than the threshold, the process proceeds to STEP S412. At STEP S412, the system controlling unit 102 re-acquires an IP address from the DHCP server 600a. The remaining lease period can be calculated by determining a difference between the lease period and the elapsed time since the reception of the IP address.

As described above, in the present embodiment, an image capturing apparatus re-acquires an IP address when the remaining lease period is shorter than a threshold, even if the lease period still remains. This can prevent the validity of the IP address from expiring during image transfer processing.

It is also possible to prevent the lease period of an IP address from expiring before shifting into a sleep state by setting a sleep shifting time as a threshold.

In addition, a method for calculating a time expected to be needed for transfer of images based on the image compression ratio and the ISO speed set in the image capturing apparatus 100 and the number of image files to be transferred, and for setting a threshold based on the time information is also employable.

It is possible to prevent the validity of an IP address from expiring during transfer of images by setting a time expected to be needed for transfer of images as a threshold.

A third exemplary embodiment will be described next. The configuration and processing of the present embodiment are similar to the configuration and processing of the first embodiment. Thus, only the differences will be described herein.

Figure 7:
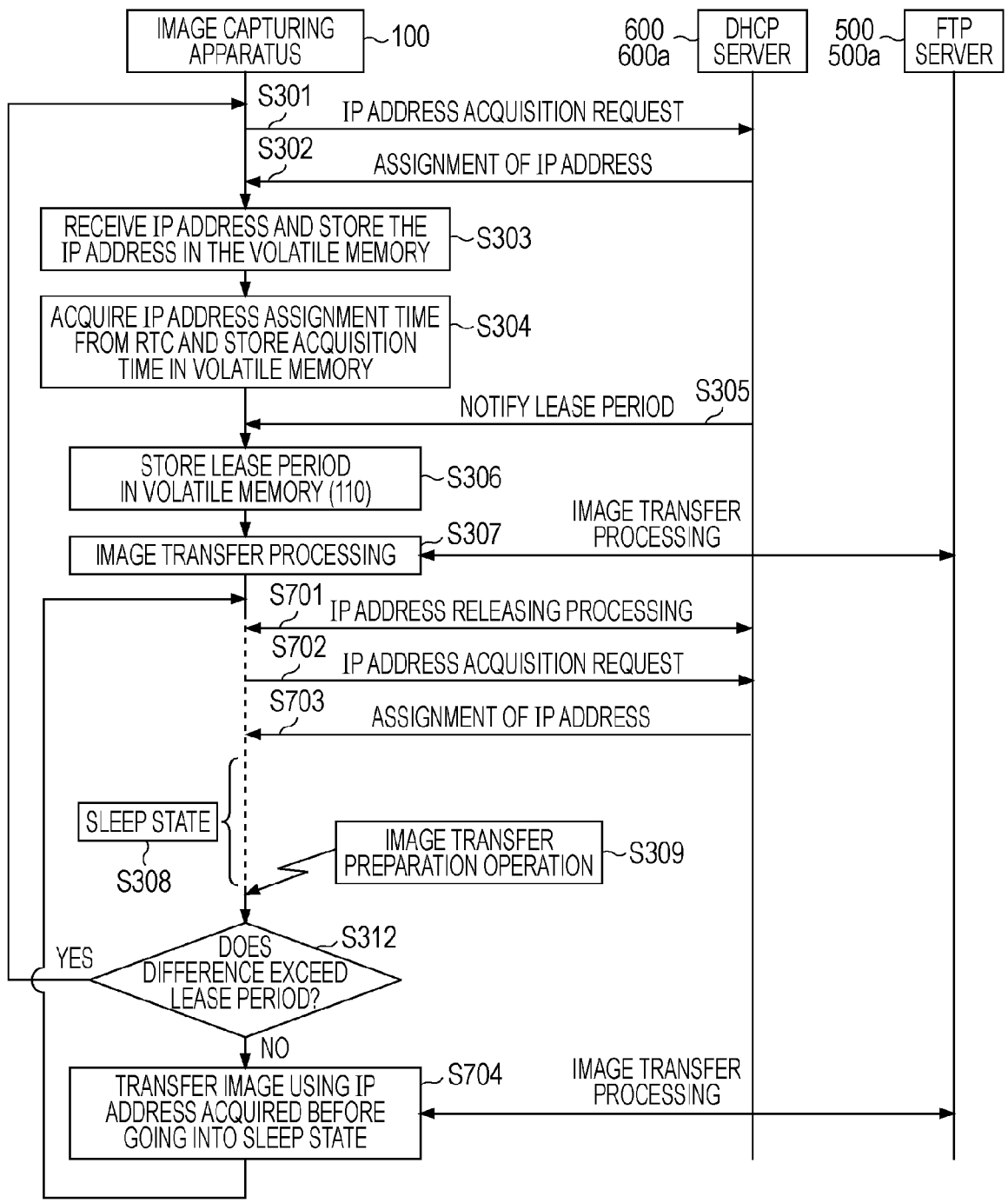
FIG. 7 is a sequence diagram illustrating processing according to an embodiment of the present invention.

More specifically, the present embodiment differs from the first embodiment in handling of an IP address and a lease period received from DHCP servers 600 and 600a. A case where an image capturing apparatus 100 receives an IP address from the DHCP server 600a will be described below with reference to FIGS. 7, 8A, and 8B.

It is assumed that images are transferred between the image capturing apparatus 100 and a personal computer 500a functioning as an FTP (File Transfer Protocol) server in the present embodiment. It is also assumed that an IP address is sent from the DHCP server 600a.

The flowchart illustrated in FIGS. 8A and 8B differs from the flowchart in FIGS. 4A and 4B in that processing at STEPs S801 and S802 is performed before STEP S424. Thus, only this difference will be described herein.

If a system controlling unit 102 determines that a sleep shifting time has passed at STEP S423 of FIG. 8B, the process proceeds to STEP S801.

At STEP S801, the system controlling unit 102 temporarily releases an IP address received from the DHCP server 600a. More specifically, the system controlling unit 102 notifies the DHCP server 600a that the IP address is no longer necessary.

At STEP S802, the system controlling unit 102 re-receives a new IP address from the DHCP server 600a and then switches the state of the image capturing apparatus 100 into the sleep state.

After waking up from the sleep state, the system controlling unit 102 determines whether a time elapsed since the reception of the IP address is longer than the lease period (STEP S411 and STEP S312). If the system controlling unit 102 determines that the lease period is longer than the elapsed time, the system controlling unit 102 establishes a connection using the IP address received immediately before shifting into the sleep state (STEP S418 and STEP S704).

As described above, in the present embodiment, an image capturing apparatus releases an IP address and re-acquires another IP address before shifting into the sleep state. This reduces the possibility that a lease period of an IP address has expired at the time of waking up from the sleep state, and often allows transfer of images to be started after a shorter starting time.

In addition, a DHCP server can assign a released IP address to another apparatus by an image capturing apparatus releasing the IP address before shifting into the sleep state. Thus, IP addresses can be efficiently utilized.

In a fourth embodiment of the present invention, a case where an image capturing apparatus 100 does not have a communication function will be described. In the present embodiment, the description is given for a case where a function similar to that of the image capturing apparatus 100 having the configuration illustrated in FIG. 2 is realized by connecting an image capturing apparatus without the communication function to a network apparatus with a connector and a cable, as previously mentioned before. The configuration and process of the present embodiment are similar to the configuration and process of the first exemplary embodiment. As such, only the differences will be described herein.

Figure 9:
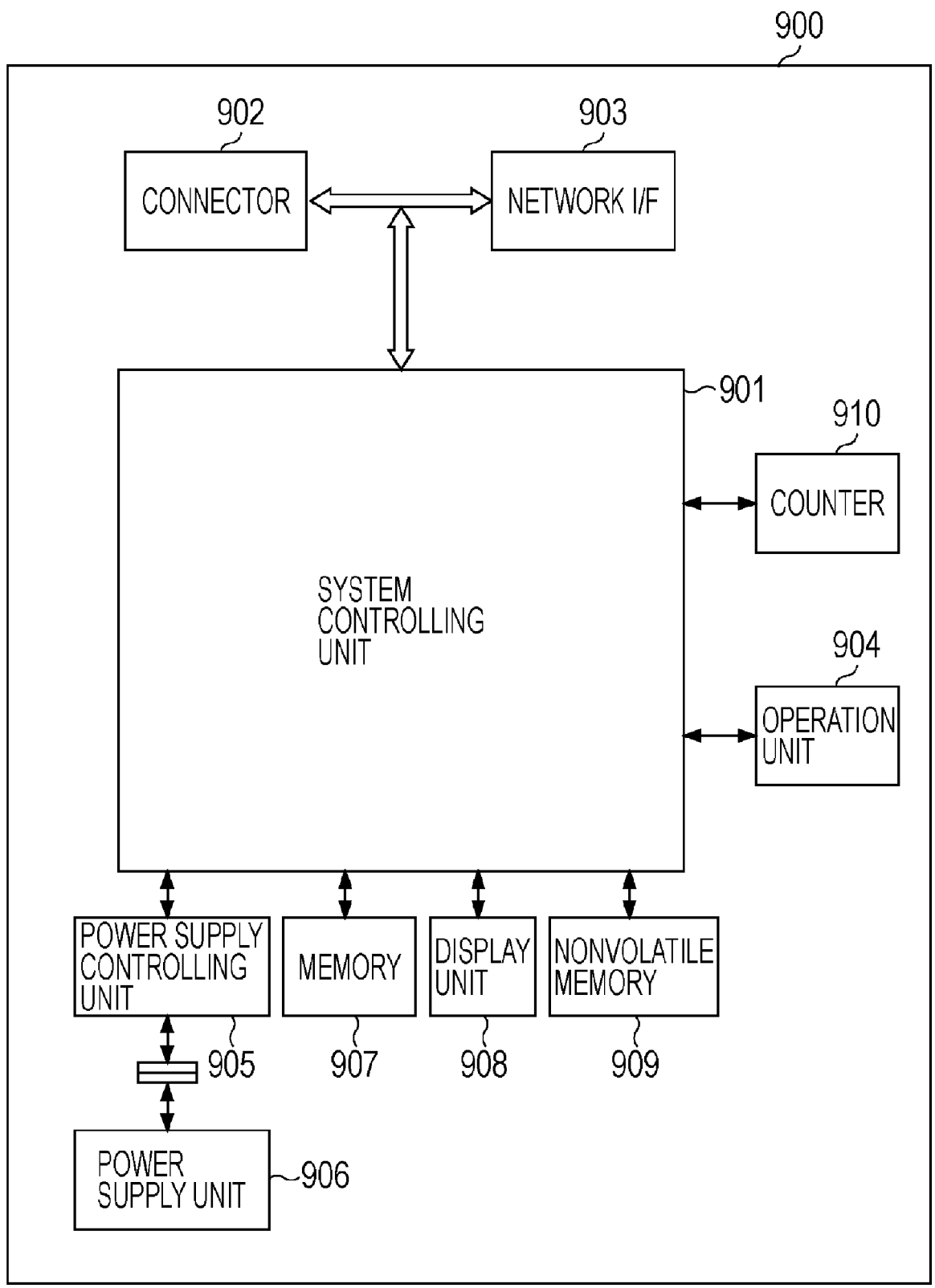
FIG. 9 is a block diagram of a communication apparatus according to exemplary embodiments of the present invention.

FIG. 9 illustrates a block diagram of a network apparatus (hereinafter, also referred to as an external communication apparatus) 900 according to the present embodiment. A system controlling unit 901, an operation unit 904, a power supply controlling unit 905, a power supply unit 906, a memory 907, a display unit 908, and a nonvolatile memory 909 have functions similar to those of the corresponding units of the image capturing apparatus 100. A connector 902 is used for connecting the network apparatus 900 to the image capturing apparatus 100. The connector 902 may be, for example, a connector for directly combining the network apparatus 900 to the image capturing apparatus 100 or a connector for connecting the network apparatus 900 to the image capturing apparatus 100 through a cable. In the present embodiment, an IP address is stored in the memory 907 or the nonvolatile memory 909 of the network apparatus 900. A counter 910 keeps time.

The image capturing apparatus 100 according to the present embodiment includes a connector instead of a network I/F 106 shown in FIG. 2. That is, the connector of the image capturing apparatus 100 is connected to the connector 902 of the network apparatus 900, and communication is performed through this connection.

Furthermore, the network apparatus 900 includes a network I/F 903. The network I/F 903 has a function similar to the network I/F 106 shown in FIG. 2. That is, the image capturing apparatus 100 without the network I/F 106 can have a communication function by simply connecting the network apparatus 900 to the connector thereof.

Image transfer processing according to the present embodiment is described below. FIG. 10 is a sequence diagram illustrating image transfer processing according to the present embodiment.

First, at STEP S1001, upon the image capturing apparatus 100 being connected to the external communication apparatus 900, the system controlling unit 901 of the external communication apparatus 900 requests the image capturing apparatus 100 to send the present time.

At STEP S1002, the system controlling unit 102 of the image capturing apparatus 100 refers to a value of the RTC 109 and sends time information including the present time to the external communication apparatus 900. The system controlling unit 901 of the external communication apparatus 900 receives the time information sent from the image capturing apparatus 100.

At STEP S1003, the system controlling unit 901 of the external communication apparatus 900 stores the present time included in the received time information in the counter 910. At this time, the counter starts keeping real time.

At STEP S1004, the system controlling unit 901 sends an IP address acquisition request to the DHCP server 600a.

At STEP S1005, the DHCP server 600a assigns an IP address to the external communication apparatus 900 and sends the IP address to the external communication apparatus 900. The system controlling unit 901 of the external communication apparatus 900 receives the IP address and stores the IP address in the nonvolatile memory 909.

At STEP S1006, the DHCP server 600a sends information on a lease period of the IP address to the external communication apparatus 900. This lease period is decided by the DHCP server 600a. The lease period information does not have to be sent at this time. For example, the lease period information may be sent at STEP S1005 along with the IP address.

At STEP S1007, the system controlling unit 901 acquires time information with reference to the counter 910. The system controlling unit 901 then stores the acquired time information in the nonvolatile memory 909 as a reception time at STEP S1008.

At STEP S1009, the system controlling unit 901 stores the lease period information received from the DHCP server 600a in the nonvolatile memory 909.

If a transfer target image is generated thereafter, image transfer processing is performed at STEP S1010. More specifically, the image capturing apparatus 100 sends an image recorded on a recording unit 104 or 105 to the external communication apparatus 900 through a connector. The external communication apparatus 900 sends the image, received through the connector 902, to an external apparatus through the network I/F 903.

A case where the external communication apparatus 900 is switched into a sleep state will now be described. Processing for switching the external communication apparatus 900 into the sleep state is similar to processing of the image capturing apparatus 100 according to the first exemplary embodiment for stopping the power supply to the network I/F 106. More specifically, the system controlling unit 102 of the image capturing apparatus 100 determines whether a transfer target image is not generated for a predetermined time. If the system controlling unit 102 determines that the image is not generated, the system controlling unit 102 sends an instruction of switching into the sleep state to the external communication apparatus 900.

Upon receiving the instruction, the system controlling unit 901 of the external communication apparatus 900 stops supplying the electric power to each unit excluding the minimum parts necessary for receiving an instruction of waking up from the sleep state. At this time, since the supply of electric power to the counter 910 is stopped, the counter 910 stops keeping time. Meanwhile, the RTC 109 of the image capturing apparatus 100 continues to keep time.

A case where a preparation operation is requested in the image capturing apparatus 100 at STEP S1011 will now be described.

In response to the preparation operation, the system controlling unit 102 of the image capturing apparatus 100 sends an instruction of waking up from the sleep state to the external communication apparatus 900 at STEP S1012. Upon receiving the instruction through the connector 902, the system controlling unit 901 of the external communication apparatus 900 supplies the electric power to each unit of the external communication apparatus 900.

At STEP S1013, the system controlling unit 901 of the external communication apparatus 900 requests the image capturing apparatus 100 to send the present time.

At STEP S1014, the system controlling unit 102 of the image capturing apparatus 100 refers to a value of the RTC 109 and sends time information including the present time to the external communication apparatus 900. The system controlling unit 901 of the external communication apparatus 900 receives the time information sent from the image capturing apparatus 100.

At STEP S1015, the system controlling unit 901 of the external communication apparatus 900 stores the present time included in the received time information in the nonvolatile memory 909 as a wake-up time.

At STEP S1016, the system controlling unit 901 of the external communication apparatus 900 calculates a difference between the reception time stored at STEP S1008 and the wake-up time stored at STEP S1015. This difference corresponds to a time elapsed since the reception of the IP address until the wake-up from the sleep state. The system controlling unit 901 then compares the calculated difference with the lease period.

At STEP S1017, the system controlling unit 901 of the external communication apparatus 900 determines whether the difference calculated at STEP S1016 exceeds the lease period. If the system controlling unit 901 determines that the difference exceeds the lease period, the process returns to STEP S1004. At STEP S1004, the system controlling unit 901 re-receives an IP address. If the system controlling unit 901 determines that the difference does not exceed the lease period, the process proceeds to STEP S1018. At STEP S1018, the system controlling unit 901 performs image transfer processing using the IP address acquired the last time, namely, the stored IP address.

As described above, even if the image capturing apparatus 100 and the communication apparatus 900 are separate apparatuses, it is possible to determine whether to re-acquire an IP address after waking up from the sleep state. The communication apparatus 900 according to the present embodiment inquires of the image capturing apparatus 100 about the time in response to the wake-up from the sleep state. This allows the communication apparatus 900 to correctly compare the time elapsed since acquisition of an IP address with a lease period even if the counter 910 of the communication apparatus 900 stops in the sleep state.

The above-described aspects of the present invention can be achieved by representing functions of image capturing apparatuses as a program, where the program is previously written on a recording medium, such as a ROM, inserting the ROM into an image capturing apparatus, and causing the image capturing apparatus to execute the program.

In such a case, a state where the program is read out from the ROM and is executed realizes the functions according to the above-described exemplary embodiments. Thus, the program and the ROM having the program recorded thereon constitute the present invention.

The program that realizes the functions of the image capturing apparatus according to the above-described exemplary embodiments may be provided after being recorded on a recording medium. For example, a semiconductor medium (such as a ROM or a nonvolatile memory), an optical recording medium (such as a DVD, an MO, an MD, or a CD), or a magnetic recording medium (such as a magnetic tape or a floppy disk) can be used as the recording medium. Alternatively, the above-described program may be provided by receiving the program having been stored in a storage device from a server apparatus computer through a communication network.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-040905 filed on Feb. 21, 2007, which is hereby incorporated by reference herein in its entirety.

What is claimed is:

1. An apparatus capable of transmitting and receiving data to and from an external device, the apparatus comprising:
   a first receiving unit configured to receive an address for use in communicating with the external device and information on a lease period of the address;
   a calculating unit configured to calculate a remaining time of the lease period based on time elapsed since reception of the address and the lease period of the address;
   an electric power controlling unit configured to control electric power supplied to the apparatus, wherein the apparatus is switched between a first state and a second state based on an amount of electric power being supplied;
   a setting unit configured to expect a time necessary for transmission of the data and to set a predetermined threshold; and
   a determining unit configured to determine whether the address is valid based on the lease period of the address if the apparatus is switched from the second state to the first state, wherein the determining unit determines that the address is valid if the remaining time is longer than the predetermined threshold set by the setting unit, and wherein the apparatus carries out communication with the external device using the received address if the address is valid.

2. The apparatus according to claim 1, further comprising:
an image capturing unit configured to capture an image of a subject to acquire image data, wherein the threshold is decided based on a setting regarding the image capturing.

3. The apparatus according to claim 1, further comprising:
an image capturing unit configured to capture an image of a subject to acquire image data,
wherein the electric power controlling unit switches the state of the apparatus from the first state to the second state when capturing of the image is not instructed for a predetermined period.

4. The apparatus according to claim 1, wherein the first receiving unit re-receives the address if the address is not valid.

5. The apparatus according to claim 4, wherein the determining unit determines whether the address is valid when the electric power controlling unit switches the state of the apparatus from the first state to the second state, and
wherein, if the address is not valid, the electric power controlling unit switches the state of the apparatus to the second state after the first receiving unit re-receives the address.

6. The apparatus according to claim 1, further comprising:
a second receiving unit configured to receive time information from the external device; and
an acquiring unit configured to acquire a time elapsed since reception of the address based on the time information received by the second receiving unit.

7. A method for controlling an apparatus that transmits and receives data to and from an external device, the method comprising:
receiving an address for use in communicating with the external device and information on a lease period of the address;
calculating a remaining time of the lease period based on time elapsed since reception of the address and the lease period of the address;
controlling electric power supplied to the apparatus, wherein the apparatus is switched between a first state and a second state based on an amount of electric power being supplied;
expecting a time necessary for transmission of the data and setting a predetermined threshold; and
determining whether the address is valid based on the lease period of the address if the apparatus is switched from the second state to the first state, wherein the determining step determines that the address is valid if the remaining time is longer than the predetermined threshold set by the setting step, and
wherein the apparatus carries out communication with the external device using the received address if the address is determined to be valid.

8. A computer-readable non-transitory storage medium storing computer-readable instructions, the computer-readable instructions causing a computer to execute the method of claim 7.

9. The apparatus according to claim 1, wherein the setting unit expects the time necessary for transmission of the data based on the number of image files to be transferred.

10. The apparatus according to claim 1, wherein the setting unit expects the time necessary for transmission of the data based on the image compression ratio set in the image capturing apparatus.

* * * * *